Sept. 11, 1951  D. F. HYLAND  2,567,813
COMBINATION SPOON LURE
Filed May 16, 1947  2 Sheets-Sheet 1
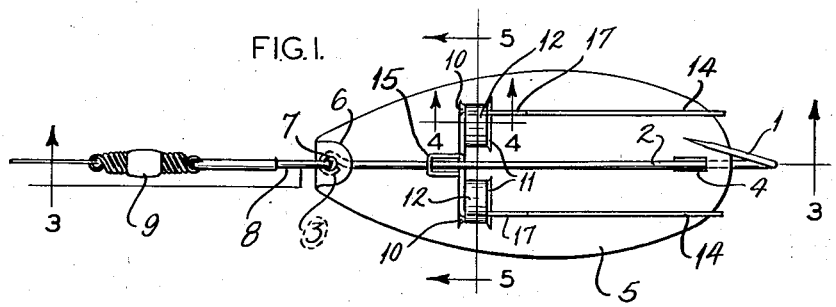
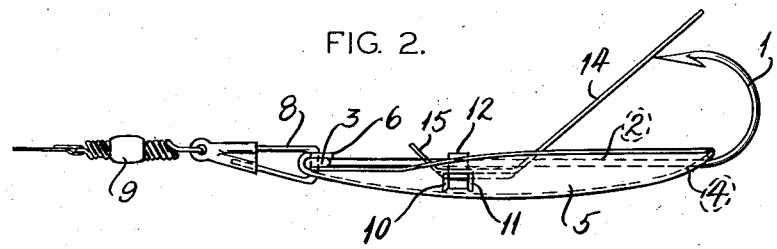
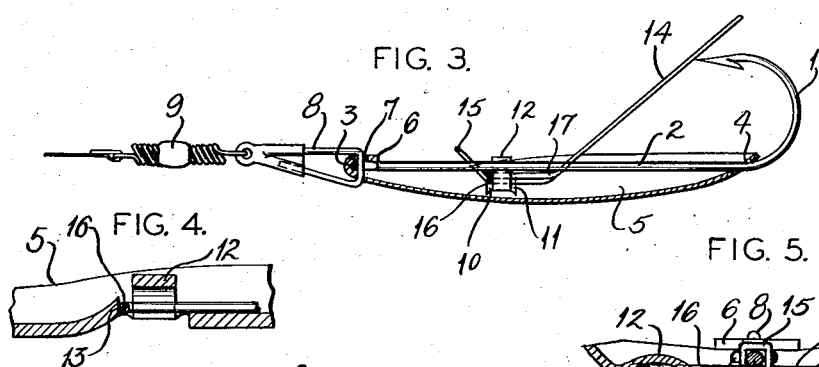
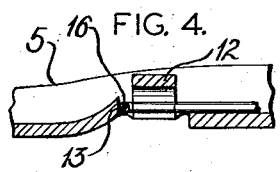
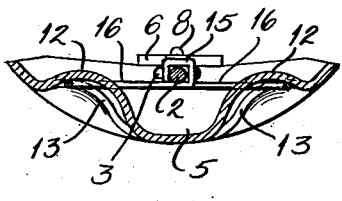
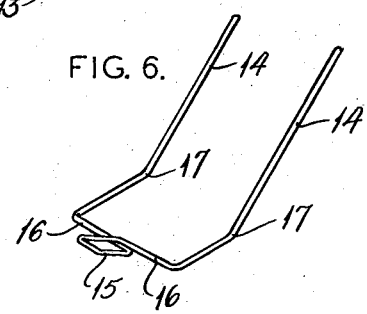
INVENTOR
DANIEL F. HYLAND
ATTORNEYS Sept. 11, 1951     D. F. HYLAND     2,567,813
COMBINATION SPOON LURE Filed May 16, 1947     2 Sheets-Sheet 2

INVENTOR:
DANIEL F. HYLAND

BY *Bruninga and Sutherland*

ATTORNEYS.

Patented Sept. 11, 1951

2,567,813

UNITED STATES PATENT OFFICE 2,567,813

COMBINATION SPOON LURE

Daniel F. Hyland, St. Louis, Mo.

Application May 16, 1947, Serial No. 748,533

4 Claims. (Cl. 43—42.52)

This invention relates to a fish lure, and more particularly the concavo-convex or spoon type of lure.

The variety of fishing lures is well-known and bespeaks the conviction of the average fisherman that fish are particularly susceptible to different shapes, colors and motions of lures at particular times and in particular places. It is frequently the case that mere changes in the atmospheric conditions taking place in a day will seem to require a change in the type of bait used by the fisherman. Smooth, rough, deep or shallow water influences the bait to be selected. Usually it is the custom to detach one lure from the line and to affix another, and numerous inventions have been directed to making this change quick and simple. Usually, however, the average fisherman is required to carry with him a large variety of artificial bait suitable to such attachment. Such lures are bulky when grouped together and require separation, one lure from another, in a large box to prevent entangling of hooks. The present invention satisfies a fisherman's desire to change his lure and overcomes the difficulty attached to having to carry many of them for variety's sake.

An object of this invention is to provide a single lure which allows for the ready substitution of different sizes, shapes and colors in a lure body member upon the same hook.

Another object of this invention is to combine with an ordinary concavo-convex lure a weed guard which is attachable and separable, to and from, the body member of the lure, or is integrally a part of such body member.

A further object of this invention is to provide a spoon lure which can be manufactured in a variety of colors in particular shapes and sizes to fit particular sizes in manufactured hooks.

Other objects will be apparent from the detail description which will be given in connection with the following drawings in which:

Figure 1 is a plan view of an embodiment of this invention;

Figure 2 is a side view of the embodiment of Figure 1;

Figure 3 is a section taken along line 3—3 of Figure 1;

Figure 4 is a section taken along line 4—4 of Figure 1;

Figure 5 is a section taken along line 5—5 of Figure 1, illustrating a particular feature of this embodiment;

Figure 6 is a perspective drawing of a weed guard suitable to attachment to the embodiment to be described;

Figure 7:
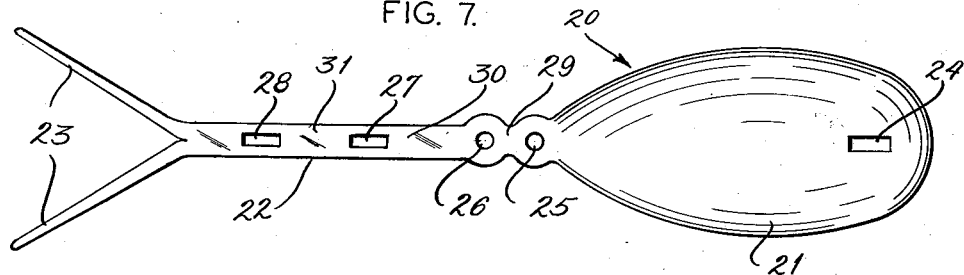
Figure 7 is a plan view of an embodiment of this invention wherein the several parts shown in Figures 1-6, inclusive, adjustable to a hook have been struck as a unit from a sheet of material.

Generally speaking, and in accordance with the first illustrative embodiment of this invention, a concavo-convex lure comprises a body or base member, substantially spoon-shaped, adapted to receive adjustably thereupon a hook and a weed guard, either singly or together. The spoon or concavo-convex base member possesses means for positioning the eye of a hook for a coincidental attachment of these two parts to a line. The concavo-convex base has at, or adjacent to, its other end means for securing the shank of the hook against lateral or vertical displacement.

The invention contemplates weed guard attaching means in the concave face of the base intermediate the two points of attachment for the hook described, and the weed guard itself is adapted to not only be adjusted to the base, but to be locked thereupon by the shank of the hook when the three elements comprising the lure are properly assembled.

The invention also contemplates the utilization of flexible material, such as plastic, in the base member whereby a flexing of the body concavously is accomplished by so situating the hook attaching means with relation to one another in the base so as to necessitate a bending force being applied through the hook in positioning the hook upon the base in final adjustment.

Referring now to the drawings, a hook 1 having a shank 2 and an eye 3 is shown in Figures 1, 2 and 3 inserted through a slot 4 in the base member 5, the eye of the hook 3 being positioned under a fold 6 at the opposite end of the concave base 5 and centered between the perforations 7 in the overlap 6 and base 5. A conventional snap 8 attached to a swivel 9 secures hook 1 and base 5 against longitudinal displacement, one from another.

In the assembly of hook 1 and base 5 it will be obvious that slot 4 is approximately the width of the diameter of the hook shank 2 and of a length sufficient to readily receive the eye 3. Moreover, to present eye 3 so as to seat snugly between fold 6 and base 5, hook 1 must be given a half-twist after eye 3 has been inserted through slot 4.

Slots 10 and 11 are shown equally spaced from and perpendicularly disposed to the longitudinal axis of the base and hook assembly. Loops 12 defined by slots 10 and 11 are upstruck from the concavo base 5 a sufficient distance to freely receive the prongs 14 of a wire weed guard.

Referring now to Figures 4 and 5, it will be seen that slots 10 differ in some respect with reference to slots 11. The forward edge of slot 10 is bent upwardly from the concavo face of the base to form a shoulder 13, whereas slot 11 has not been so deformed.

The weed guard, Figure 6, is shown to consist of a single strip of wire bent to form an eye 15 of the general dimensions of the eye 3 of hook 1, and has depending shoulders 16 and prongs 14. Prongs 14 are each bent along their length at 17. In the assembled position, particular reference now being had to Figure 5, the weed guard, generally to be designated 18, is positioned through the loops 12 in the base 5 so as to dispose shoulders 16 between shoulders 13 of the slots 10 and the edges of the loops 12, as clearly shown in Figure 4. With the weed guard thus positioned, the hook 1 is inserted as hereinbefore described, the eye 3 being passed through the eye 15 of the weed guard before it is given a half-twist and eye 3 seated for attachment between fold 6 and base 5 of the body member. Positioned thus, weed guard 17 is secured against longitudinal displacement by the shoulder 13 and against displacement upwardly or laterally with relation to the concavo base by both the loops 12 and its eye 15 which is in physical contact with shank 2 of the hook 1.

In the embodiment hereinbefore described, base 5 is preferably made of plastic and in a variety of colors, although spoons of metal or wood, suitably painted, can be substituted. The body member may also be fluted or stream-lined, the design being controlled by the particular movement desired in the lure when it is drawn through the water. Flexibility, however, in the material of the member 5 is advantageous, for if slot 4 is situated at a point on the longitudinal axis of the base 5, so that base 5 must be bent concavously to receive the hook shank 2, when the eye 3 is seated between fold 6 and the forward end of the base 5, Figure 2, this flexing will secure the hook more firmly and prevent accidental displacement of the hook eye with relation to the holes 7 when the two parts are in position for joining by the snap 8. Flexure in the body member 5 may of course, be varied by providing a series of slots 4 between its forward and trailing edge. A greater flexing force must be applied to align a slot near the midpoint of the concavo base with the point of attachment of the hook eye than would be necessary to align a slot more closely situated to the trailing edge of the base.

While, as has been said, flexibility in a body member 5, Figures 1–6, is advantageous, materials without flexibility and capable of deformation can also be used. In fact such materials permit the forming of the body member and the weed guard of the invention into a single blank which can then be bent, Figures 7, 8 and 9, for mounting upon a hook to provide a lure functionally identical with that illustrated in Figures 1 and 2.

Figure 8:
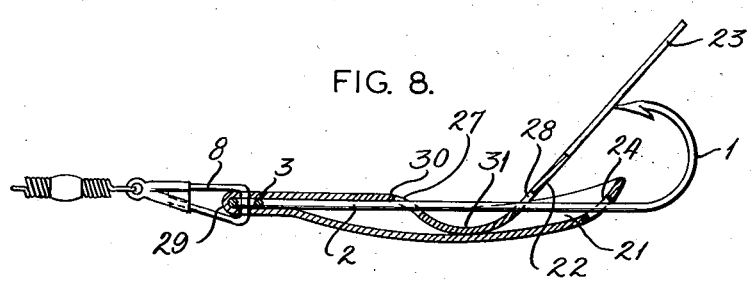
Figure 8 is a cross section of the embodiment of Figure 7, folded and adjusted to a hook.
Figure 9:
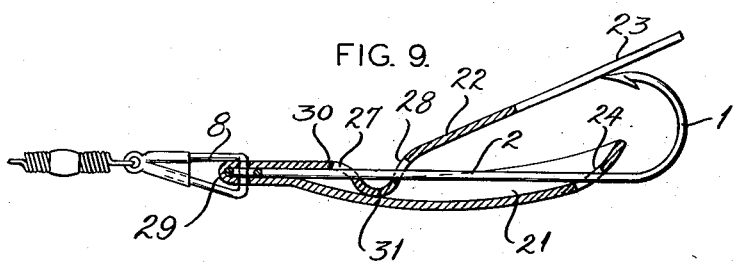
Figure 9 is a cross section of the embodiment in Figure 7, folded and adjusted to a hook in a manner differing from the adjustment in Figure 8.

Referring particularly to Figures 7, 8 and 9, a blank, generally designated 20, struck from a sheet of deformable material has a spoonshaped portion 21 and a neck 22 connected thereto terminating in divergently-extending fingers 23. Spaced at intervals along the long axis of the blank are the perforations 24, 25, 26, 27 and 28. Perforations 24, 27 and 28 are slots through which a hook eye may be passed and perforations 25 and 26 are holes of a size sufficient to receive a snap fastener attached to a line.

Blank 20, bent at points 29, 30 and 31, is shown, Figures 8 and 9, in different positions of adjustment to a hook 1, its shank 2 and its eye 3. It is readily apparent from these figures that slots 24, 27 and 28 cooperate in this embodiment to secure shank 2 of the hook in a plane vertical to the longitudinal axis of the lure spoon 21 and that the holes 25 and 26 in the neck 22 function in conjunction with eye 3 to secure the lure against longitudinal displacement of its elements when the snap 8 attaches the two parts to a line.

It is contemplated that slots 27 and 28 if placed closely adjacent to the forward or snap end of spoon 20 Fig. 9 will require longer guarding arms 23 than those shown in Figures 7 and 8. Where some flexibility is inherent in the material from which the blank is struck such long guarding arms would be advantageous. As a modification in the blank 20 more slots might be provided in the neck 22 which would permit the fisherman to determine for himself which slot or two slots provided the best adjustment of the arms 23 with relation to the hook barb in the assembled lure.

In the assembly of parts which make up these embodiments of the invention, it is possible for a fisherman to quickly and easily vary the color, shape and size of the body member he desires to use with any particular hook, the limit of overall size of the lure being, of course, confined to the length of the shank of the particular hook chosen and the width of the body member selected to fit it. With small or large hooks, however, a variety of body members of the embodiment of Figures 1–6 may be carried for each, each hook size nesting compactly in a single box in the fisherman's pocket. In the same manner the separate weed guards of that embodiment can be separated by size and grouped and also carried within a small box. That the two embodiments described can be easily and quickly joined together and snapped to a line without any possibility of delay through the entangling of these elements will be apparent.

This invention is not limited to the particular modifications described in the drawings. A variety of changes are possible in both the base and the weed guard of the embodiment of Figures 1–6. It is contemplated that rather than a slot for securing the shank of the hook that a simple flexible clamp might serve the same purpose. Clamps, too, can be used rather than the loops integral with the base for positioning the weed guard upon the base. With reference to the weed guard, it need not be of a single strip of bent wire, but might be of some other material and of a different size and shape.

Having thus described the invention, what is claimed and desired to be secured by Letters Patent is:

1. A fishing lure having a spoon, a hook having a straight shank, and a weed guard, said spoon and said hook having eyes adapted to be aligned and connected, and said shank extending through a completely surrounding eye in said weed guard and also through a hole in said spoon for maintaining said parts in predetermined relation each to the other.

2. A fishing lure for use with a shanked hook, comprising a spoon and a weed guard integral with said spoon, said weed guard having slots aligned to receive the shank of the hook.

3. A lure body member of sheet material having a spoon portion, a guard portion, and a narrow strip portion connecting the spoon and guard portions, said guard portion providing a pair of diverging weed guard arms, and said spoon and strip portions having perforations spaced longitudinally therealong.

4. A fishing lure for use with a straight-shanked hook having an eye, comprising a spoon having an eye at its forward edge for alignment and connection with the eye of said hook and a hole below its trailing edge for receiving the shank of said hook, and a weed guard having an eye in the form of a complete loop for completely surrounding the shank of said hook to maintain said weed guard and spoon in predetermined relation each to the other.

DANIEL F. HYLAND.

REFERENCES CITED

The following references are of record in the file of this patent:

UNITED STATES PATENTS

| Number | Name | Date |
| --- | --- | --- |
| 1,992,766 | Pflueger | Feb. 26, 1935 |
| 2,160,347 | Walsh | May 30, 1939 |
| 2,164,415 | Mallett | July 4, 1939 |
| 2,167,163 | Toepper | July 25, 1939 |
| 2,254,981 | Sisco | Sept. 2, 1941 |
| 2,462,828 | Parnell, Sr. | Feb. 22, 1949 |